Patented Dec. 22, 1942

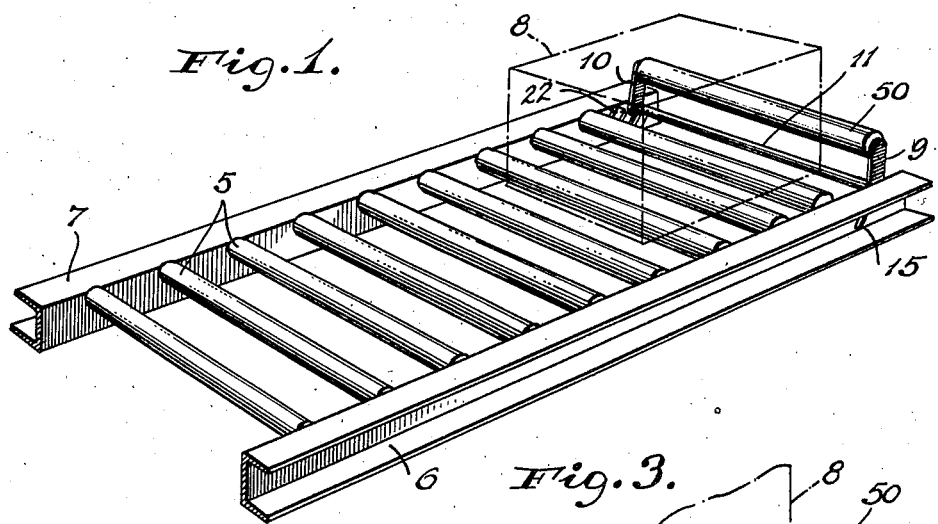
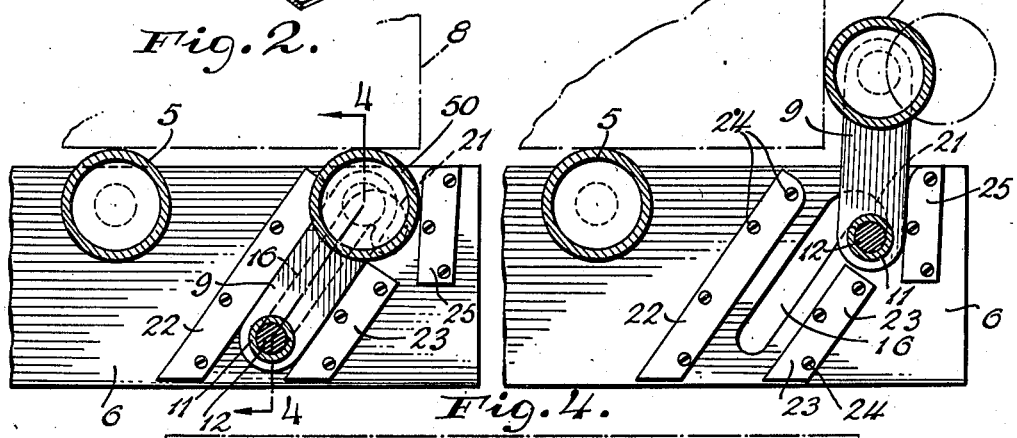
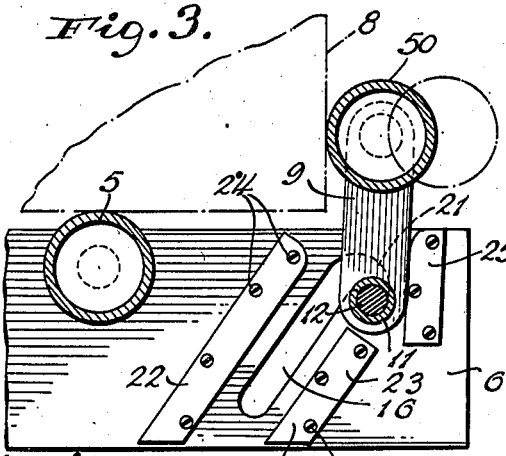
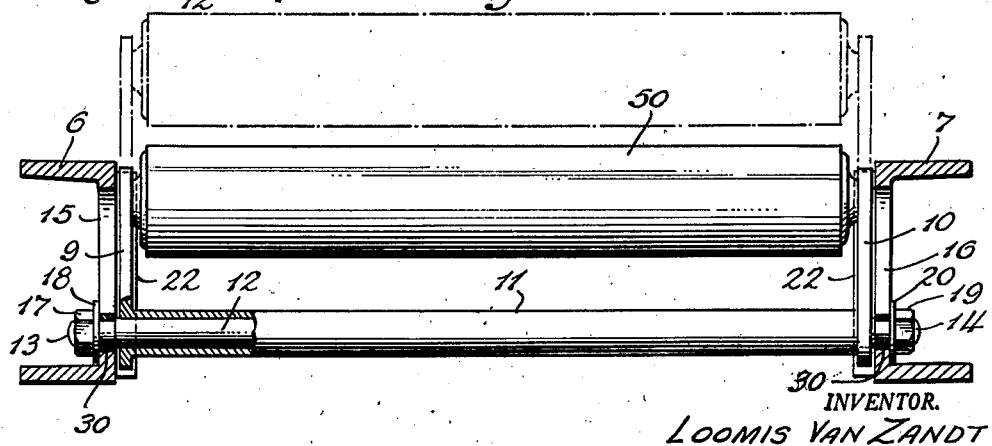

2,306,101

UNITED STATES PATENT OFFICE 2,306,101

STOP FOR CONVEYER

Loomis Van Zandt, New York, N. Y.

Application December 20, 1941, Serial No. 423,727

4 Claims. (Cl. 193—35)

This invention relates to a stop for roller conveyers.

Roller conveyers comprise usually a plurality of elongated rotary rollers or cylinders located parallel to each other and one behind the other, so that a package placed upon these rollers can slide conveniently upon the causeway formed by the rollers either by gravity or through a force exerted upon the package at the time it is placed thereon.

It is often necessary to interrupt the movement of packages upon the causeway or at its ends, for instance, when the causeway is inclined and a receiving vehicle is located at its lower end. Heretofore, this was attained by the use of wedges or the like, which were placed at an end of the causeway. This arrangement was found unsatisfactory, since the wedges are difficult to remove, since they may damage the rollers and packages, and since they do not permit the removal of packages.

An object of the present invention is to provide a stop for roller conveyers, which will operate effectively whenever the packages are to be stopped and which, when not in use, will not interfere with the movement of the packages.

Another object is the provision of a roller conveyer, a part of which is so constructed that it may be used as a stop which prevents movement of the packages upon the conveyer, but which makes it possible to remove the packages by hand while the stop remains in place to block the following packages.

Other objects of the present invention will become apparent in the course of the following specification.

In accomplishing the objects of the present invention, it was found desirable to utilize one of the rollers of the conveyer as a stop for the packages. To this end, the stop roller is mounted upon arms which are connected to a transverse rod slidably mounted in grooves provided in the angle irons which carry all the rollers. The grooves are so formed that the roller serving as a stop can be conveniently maintained in a lower position as well as in an upper raised position. In the lower position the roller is flush with all the other rollers and functions in the same manner as they do. In the upper position, the roller is raised above the other rollers, so that it can conveniently serve as a stop. Suitable means are provided to guide the roller during its movement from the lower position to the upper position and vice versa, and to hold the roller securely in its upper position despite the impact which it may receive from a moving package.

The invention will appear more clearly from the following detailed description when taken in connection with the accompanying drawing showing, by way of example, a preferred embodiment of the inventive idea.

In the drawing:

Figure 1 is a perspective view of a portion of a roller conveyer constructed in accordance with the principles of the present invention.

Figure 2 is a sectional view illustrating a roller which serves as a stop, in its lower position.

Figure 3 is similar to Figure 2 and shows the stop roller in its uppermost position.

Figure 4 is a section along the lines 4—4 of Figure 2.

The conveyer illustrated in the drawing is constituted by a plurality of elongated cylinders or rollers 5 which are mounted parallel to each other and one behind the other in two angle irons 6 and 7. The roller which serves as a stop is designated by the numeral 50 in the drawing. The rollers 5 have ends rotatably mounted in suitable openings provided in the angle irons 6 and 7 and extend somewhat above these angle irons, so that whenever a package 8 is moved upon a causeway formed by these rollers by an extraneous force or gravity, the rotation of the rollers will cause the package 8 to slide quickly along the causeway from its receiving end to its delivery end.

In the position shown in Figure 2, the stop roller 50 is flush with all the other rollers 5, so that a package 8 may conveniently slide over the roller 50 as well as over the other rollers.

The two ends of the roller 50 are rotatably mounted in the upper ends of arms 9 and 10, respectively. The arms 9 and 10 are joined by a sleeve 11 which may be integral with these arms. A rod 12 extends through the sleeve 11 and has two threaded ends 13 and 14 which project out of the sleeve 11. The end 13 of the rod 12 extends through an elongated slot 15 which is provided in the angle iron 6, while the end 14 extends through a similar slot 16 formed in the angle iron 7. A nut 17 is screwed upon the end 13 of the rod 12 and engages a washer 18 which is wider than the slot 15. Similarly, the end 14 carries a nut 19 and a washer 20. Due to this arrangement, the rod 12 is maintained in place and cannot shift sidewise. The rod 12 carries bushings 30 which remain in slots 15 and 16 and are used to prevent wear and tear on the rod 12 and the slots 15 and 16.

The two slots 15 and 16 have the same form and extend in alinement with each other. As shown in Figure 3, each of the slots has a narrow elongated main portion which extends at an acute angle to the plane of the rollers. Due to this arrangement, the roller 50 will not interfere with the other rollers 5 while it is being moved up or down. As shown in Figures 2 and 3, the upper end of each of the slots 15 and 16 has the form of a hook or pocket 21, so that the rod 12 is firmly embedded in this part of the slots 15 and 16 in the upper position of the roller 50.

Metal strips 22 and 23 extend on both sides of the slots 15 and 16 and are attached to the inner surfaces of the angle irons 6 and 7 by screws 24. These metal strips 22 and 23 serve as guides during an upward movement or downward movement of the roller 50. Other strips 25 which are also attached by screws 24 to the inner surfaces of the angle irons 6 and 7, are located close to the portions 21 of the slots 15 and 16 and serve as abutments or stops receiving pressure transmitted to the arms 9 and 10 by the impact of a package 8 against the stop roller 50.

The operation of the device is apparent from the drawing and the above description. When the stop roller 50 is flush with the other rollers 5, (Fig. 2) the packages 8 will slide upon the causeway formed by the rollers until its delivery end is reached. In order to stop this flow of packages, the operator raises a stop roller 50 by hand, inserting the ends of the rod 12 into the hook-shaped pockets 21 of the slots 15 and 16. Then the roller 50 is situated in its upper position shown in Figure 3, wherein its arms 9 and 10 lean against the guides 25 and wherein the roller 50 serves as an effective barrier which prevents further movement of the package. Due to the provision of pockets 21, the rod 12 is firmly embedded in the slots 15 and 16 and will not be forced out of these slots, even though a package 8 may strike the roller 50 with considerable force.

It is apparent that the specific structure shown above is subject to wide variations and modifications without departing from the scope or the intent of the present invention. All of such variations and modifications are to be included within the scope of the present invention.

What is claimed is:

1. In a roller conveyer having a plurality of rotary rollers constituting a rollerway, a device for stopping a package moving upon said rollerway, said device comprising a single roller movable separately from and independently of all other rollers from a lower position to an upper position and vice versa, said movable roller being flush with other rollers of the roller conveyer in said lower position and extending in said upper position above said other rollers to serve as a barrier for said package, and means connected with said movable roller and maintaining it in each of said two positions.

2. In a roller conveyer having two parallel elongated supports and a plurality of rollers rotatably mounted at both ends in said supports to constitute a rollerway, a device for stopping a package sliding along said rollerway, said device comprising a single stop roller and arms rotatably supporting said stop roller and movably connected with said supports to shift said stop roller separately from and independently of all other rollers from a lower position to an upper position and vice versa, said stop roller being flush with other rollers of the roller conveyer in said lower position and extending in said upper position above said other rollers to serve as a barrier for said package.

3. In a roller conveyer having two parallel elongated supports and a plurality of rollers rotatably mounted with their two ends in said supports and constituting a rollerway, a device for stopping a package moving along said rollerway, said device comprising a stop roller, two arms rotatably supporting said stop roller at its two ends, said supports having slots formed therein, and means connected with said arms and movable in said slots to shift said stop roller from a lower position to an upper position and vice versa, said stop roller being flush with other rollers of the roller conveyer in said lower position and extending in said upper position above said other rollers to serve as a barrier for said package.

4. In a roller conveyer having two parallel angle irons and a plurality of rollers rotatably mounted with their two ends in said angle irons and constituting a rollerway, a device for stopping a package moving along said rollerway, said device comprising a stop roller, two arms rotatably supporting said stop roller at its two ends, a sleeve interconnecting said arms, a rod extending through said sleeve, each of said angle irons having a slot formed therein, said slots being in alinement with each other and having upper hook-shaped pocket-like portions, the ends of said rod extending through said slots, whereby said stop roller is movable from a lower position to an upper position and vice versa, said stop roller being flush with other rollers of the roller conveyer in said lower position and extending in said upper position above said other rollers to serve as a barrier for said package, and guides carried by said angle irons and engaging said arms in the upper and lower positions of said stop roller.

LOOMIS VAN ZANDT.